United States Patent
Militello et al.

(10) Patent No.: US 7,038,347 B2
(45) Date of Patent: *May 2, 2006

(54) OPTIMIZED ALTERNATOR BOBBIN

(75) Inventors: Anthony Militello, Ypsilanti, MI (US); Michael Timothy York, Chelsea, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/837,965

(22) Filed: May 3, 2004

(65) Prior Publication Data

US 2005/0242680 A1    Nov. 3, 2005

(51) Int. Cl.
    *H02K 1/00*     (2006.01)
(52) U.S. Cl. ..................................... 310/194; 310/263
(58) Field of Classification Search .............. 310/49 R, 310/194, 216–218, 261, 263, 265
See application file for complete search history.

(56) References Cited

U.S. PATENT DOCUMENTS

| | | | |
|---|---|---|---|
| 2,243,318 A | 5/1941 | Rawlings | |
| 3,215,877 A | 11/1965 | Raver et al. | |
| 3,305,740 A | 2/1967 | Shano | |
| 3,483,411 A | 12/1969 | Amako et al. | |
| 3,501,661 A | 3/1970 | Heinzen et al. | |
| 3,603,825 A | 9/1971 | Sheridan | |
| 4,117,793 A | 10/1978 | Preece et al. | |
| 4,307,314 A * | 12/1981 | Yamada et al. | 310/263 |
| 4,506,180 A | 3/1985 | Shizuka et al. | |
| 4,902,922 A | 2/1990 | Annovazzi | |
| 5,081,383 A | 1/1992 | Kusumoto et al. | |
| 5,097,169 A | 3/1992 | Fukushima | |
| 5,361,011 A | 11/1994 | York | |
| 5,506,180 A | 4/1996 | Ponthieu | |
| 5,539,265 A | 7/1996 | Harris et al. | |
| 5,714,822 A | 2/1998 | Kawano et al. | |
| 5,796,201 A | 8/1998 | Kamitani et al. | |
| 5,900,688 A | 5/1999 | Kreuzer et al. | |
| 5,945,765 A | 8/1999 | Chen | |
| 5,969,459 A | 10/1999 | Taniguchi et al. | |
| 5,973,423 A | 10/1999 | Hazelton et al. | |
| 6,037,694 A | 3/2000 | Asao et al. | |
| 6,107,719 A | 8/2000 | Asao | |
| 6,252,330 B1 | 6/2001 | Asao et al. | |

(Continued)

FOREIGN PATENT DOCUMENTS

FR    2616280    9/1988

(Continued)

*Primary Examiner*—Thanh Lam
(74) *Attorney, Agent, or Firm*—Brinks Hofer Gilson & Lione

(57) ABSTRACT

A rotor for an alternator is provided which has the benefits of a thin bobbin, as well as the benefits of a single contact steel core, thereby increasing the dissipation of heat and maximizing the space for winding the field coil to increase the overall power provided by the rotor and alternator. The rotor includes a bobbin assembly having a hollow cylinder with a first end and a second end, a first end cap attached to the first end of the cylinder and a second end cap attached to the second end of the cylinder. The bobbin assembly further includes a metallic sleeve fitted inside the hollow cylinder and providing support to the hollow cylinder.

18 Claims, 5 Drawing Sheets

U.S. PATENT DOCUMENTS

| | | |
|---|---|---|
| 6,333,582 B1 | 12/2001 | Asao et al. |
| 6,369,486 B1 | 4/2002 | Armiroli et al. |
| 6,384,506 B1 | 5/2002 | Kojima et al. |
| 6,707,227 B1 * | 3/2004 | York et al. ............... 310/263 |
| 6,777,845 B1 * | 8/2004 | York et al. ............... 310/194 |
| 6,888,271 B1 * | 5/2005 | York ............... 310/263 |
| 2003/0137209 A1 | 7/2003 | Do et al. |

FOREIGN PATENT DOCUMENTS

| | | |
|---|---|---|
| GB | 2294160 A | 4/1996 |

* cited by examiner

OPTIMIZED ALTERNATOR BOBBIN

FIELD OF THE INVENTION

The present invention relates generally to rotors for alternators, and more particularly relates to bobbins used in such rotors.

BACKGROUND OF THE INVENTION

Currently, the majority of all vehicles driven today use front-end accessory drive alternators that contain Lundell style rotors, also known as "claw pole" rotors. The rotor provides the alternator's magnetic field and rotates within the machine. The rotor includes a field coil made up of a number of insulated copper wires wrapped around an electrically insulated bobbin. The bobbin surrounds a steel hub, and also insulates the field coil from the steel pole pieces which sandwich the field coil to form north and south poles. The magnetic field is generated when the field coil is energized and a current flows through the wires.

In such claw pole rotors, it is preferable to incorporate the steel core or hub into the pole pieces. Stated another way, each pole piece includes one half of the steel center hub, thereby forming a single face-to-face contact region. This design is preferred because by reducing the number of contact regions or surfaces, the magnetic field strength of the rotor increases, which is proportional to the amount of power the alternator can provide to the vehicle system. In these designs, the insulating bobbin needs to be relatively rigid and sturdy in order to support winding of the field coil directly onto the bobbin. Both the central cylinder and the opposing end caps of the bobbin need to provide sufficient support to confine the winding of the field coil. The bobbin is therefore typically formed of a relatively thick material.

Unfortunately, such thick bobbins reduce the dissipation of heat in the rotor and occupy space that could be better used for additional field coil or steel. In particular, the field strength of the rotor and the power of the alternator is increased by increasing the size of the coil or by applying more current therethrough. However, as current increases the power dissipation in the form of heat that goes up at a rate that is squared, given by the governing equation $P=I^2R$, where P equals the power dissipation due to heat, I equals current and R equals the resistance of the coil.

Thus, some rotor and bobbin designs have been proposed where the bobbin is formed of a relatively thin material. Several exemplary bobbins are described in copending U.S. application Ser. Nos. 10/264,778, 10/057,059 and 10/057,061, commonly held by the Assignee of the present invention and the disclosures of which are hereby incorporated by reference in their entirety. With a thin bobbin, the steel hub is formed as a cylinder, on which two bobbin end caps are situated and taped down. The tape and folded inner flaps of the end caps form the central cylinder portion of the bobbin insulating the steel hub from the field coil. In this way, the steel hub may thus form structural support for winding the field coil directly onto the bobbin formed by the end caps and tape. Unfortunately, this design does not permit use of pole pieces having the hub integrally formed therein.

Accordingly, there exist a need to provide a rotor having a bobbin that is thin to promote heat transfer and increase the percentage of field coil winding, which also allows for both winding of the field coil directly on the bobbin, as well as the use of pole pieces having the steel hub integrally formed therein.

BRIEF SUMMARY OF THE INVENTION

A rotor for an alternator or other dynamoelectric machine is provided in one embodiment constructed in accordance with the teachings of the present invention. The rotor has the benefits of a thin bobbin, as well as the benefits of a single contact steel core, thereby increasing the dissipation of heat and maximizing the space for winding the field coil to increase the overall power provided by the rotor and alternator. The rotor generally includes a field coil, a pair of opposing pole pieces and a bobbin assembly. The field coil generates a magnetic flux, while the pole pieces sandwich the field coil for guiding the magnetic flux. The bobbin assembly is interposed between the field coil and each of the pole pieces. The bobbin assembly includes a hollow cylinder having a first end and a second end, a first end cap attached to the first end of the cylinder and a second end cap attached to the second end of the cylinder. The bobbin assembly further includes a metallic sleeve fitted inside the hollow cylinder and providing support to the hollow cylinder.

According to more detailed aspects, the sleeve includes an axial slip extending completely through the sleeve to allow the diameter of the sleeve to change. Preferably, the sleeve is formed from a flat sheet that is rolled into a cylindrical shape. The slit defines first and second ends of the sleeve, and the first and second ends engage the cylinder. The cylinder preferably includes a locking projection engaging the sleeve. The locking projection defines first and second slots receiving the first and second ends of the sleeve. The slots are sized and positioned to permit the diameter of the sleeve to adjust when the sleeve is attached to the cylinder. The cylinder may include one or more retaining tabs extending radially inwardly from one or both of the first and second ends of the cylinder. The retaining tabs are sized and positioned to limit the axial movement of the sleeve relative to the cylinder.

A method of forming a rotor is also provided in accordance with the teachings of the present invention. A hollow cylinder is provided having opposing ends. A first end cap and a second end cap are attached to the opposing ends of the cylinder. A sleeve is positioned inside the cylinder. A field coil is wound onto the cylinder. Opposing pole pieces are then positioned at opposing ends of the cylinder.

According to more detailed aspects, the step of positioning the sleeve may include sliding the sleeve inside the cylinder from a first end of the cylinder. The second end of the cylinder has retaining tabs to limit the axial movement of the sleeve. The pole pieces preferably each include a core portion sized to fit inside the cylinder, wherein the sleeve expands to receive the core portion of the pole pieces.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
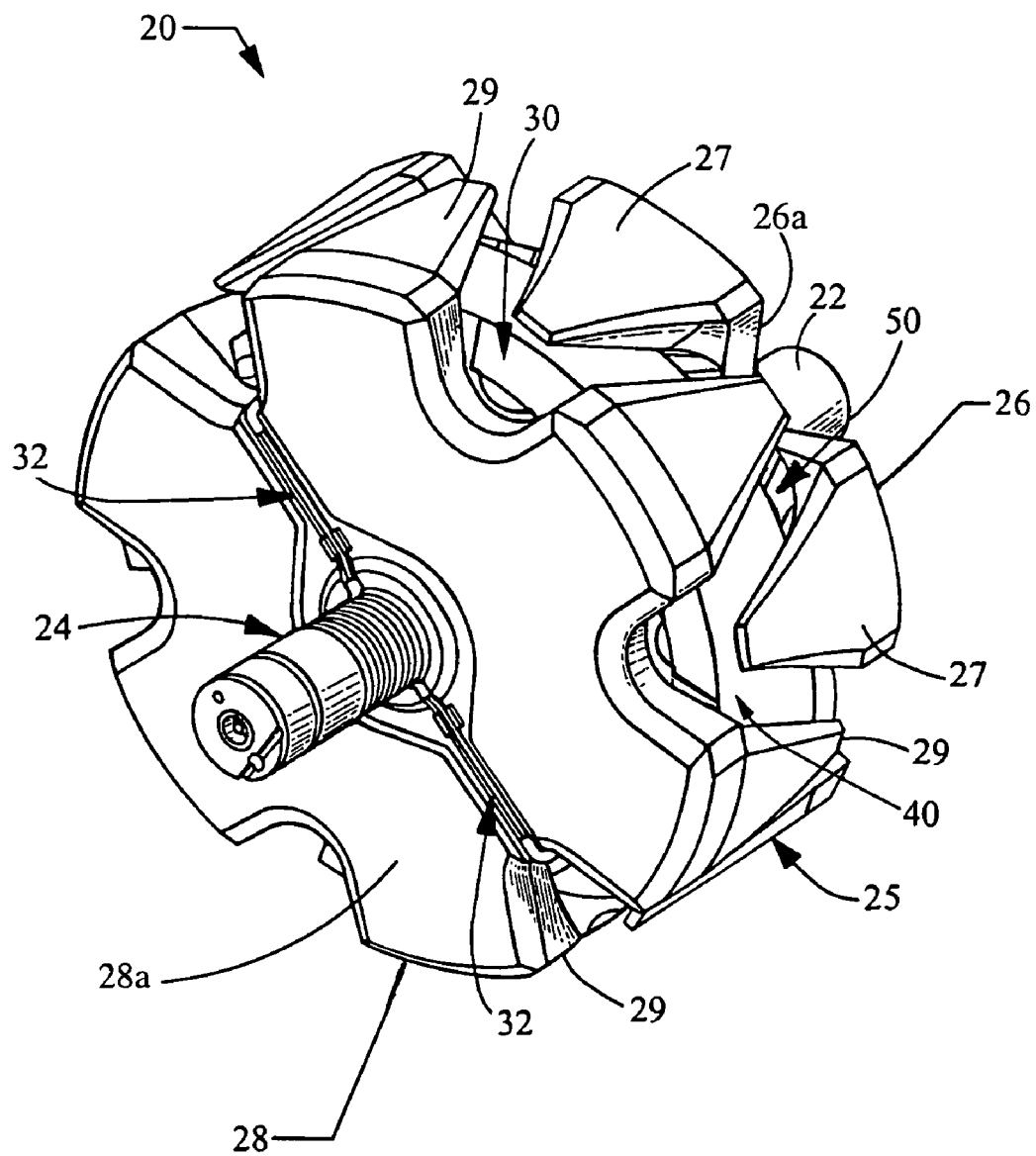
FIG. 1 is a perspective view of a rotor constructed in accordance with the present invention.

Turning now to the figures, FIG. 1 shows an assembled rotor 20 having a bobbin assembly 50 constructed according to the teachings of the present invention. Generally, the rotor includes a shaft 22 defining a central axis passing through the center of the rotor and including a slip ring assembly 24 for providing power to the rotor 20. The rotor further includes a first or front pole 26 and a second or rear pole 28. These opposing poles 26, 28 each include a plurality of fingers 27, 29, respectively, which are equidistantly spaced about the periphery of the poles 26, 28. The fingers 27, 29 depend transversely from the main bodies 26a, 28a of the poles 26, 28, and accordingly extend in an axial direction. The fingers 27, 29 face each other when the rotor 20 is assembled. Accordingly, the peripheral side surface 25 of the rotor 20 generally alternates between the fingers 27 and fingers 29 of the front pole 26 and the rear pole 28, respectively.

The poles 26, 28 are used to encase a coil assembly or field coil 30 therebetween. The coil assembly includes two leads 32 which extend in a slot along the outer surface of the rear pole main body 28a for internal connection to the slip ring assembly 24. The leads 32 include a wire 31 which is covered with insulation 33. When the coil 30 is powered via the slip ring assembly 24 and leads 32, a magnetic field is generated which flows through the pole pieces 26, 28, while the entire rotor assembly 20 is rotated via shaft 22 within the alternator.

Further details of the bobbin assembly 50 will now be described with reference to FIGS. 2–5. As shown in the exploded view of FIG. 2, the bobbin assembly 50 includes a first end cap 52, a second end cap 54 and a hollow cylinder 60. Each end cap 52, 54 includes a plurality of flaps 53, 55 which project radially outwardly and are equidistantly spaced about the end caps 52, 54. The flaps 53, 55 are numbered, sized and structured to correspond with the fingers 27, 29 of the pole pieces 26, 28. Each of the end caps 52, 54 include a cut-out center portion 56, 58 which is sized and shaped to correspond with the cylinder 60.

Figure 6:
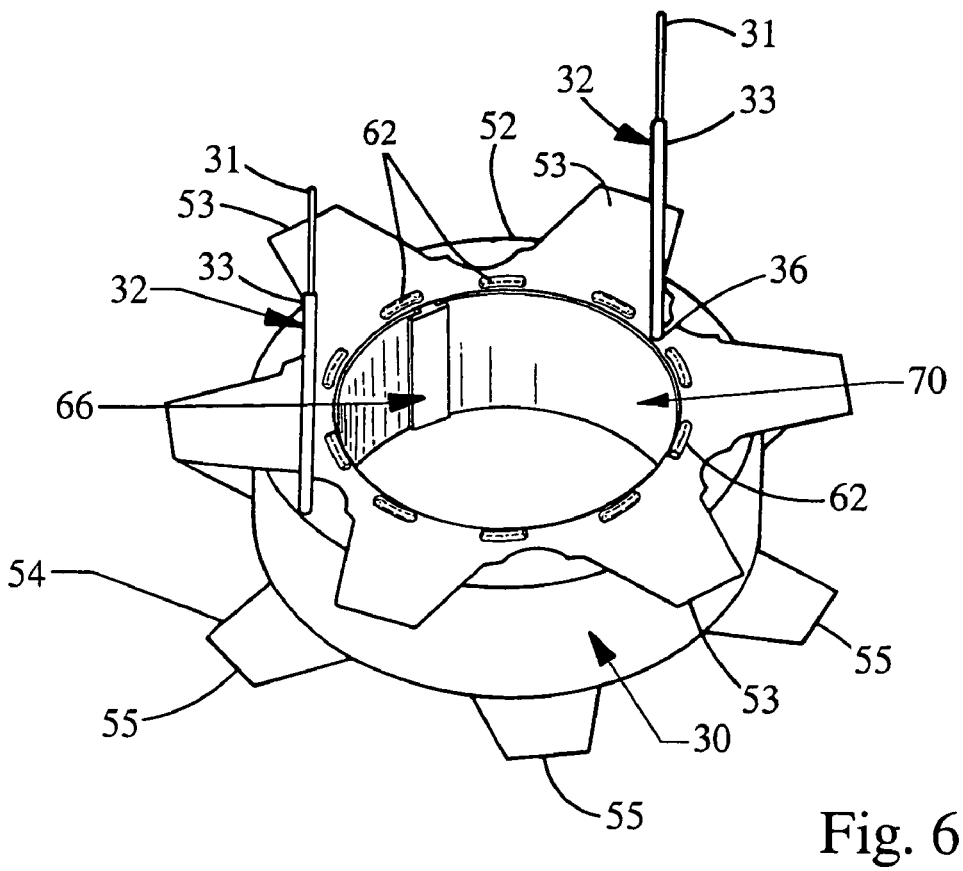
FIG. 6 is a perspective view of the bobbin assembly shown in FIGS. 2 and 3 having a field coil wound thereon.

The cylinder 60 includes opposing first and second ends 61, 63. The outer periphery of the cylinder 60 between the ends 61, 63 may include a plurality of winding grooves 64 in order to provide a structured start to the winding of the field coil 30 (FIG. 6) thereby providing for a more compact winding. In this way, the winding density of the coil in the limited space is maximized, while air gaps are minimized. The cylinder core 60 could also be made from a molded flat sheet of plastic that is rolled up and seam molded together. Similarly, all other types of plastic welding can also be applied.

Figure 3:
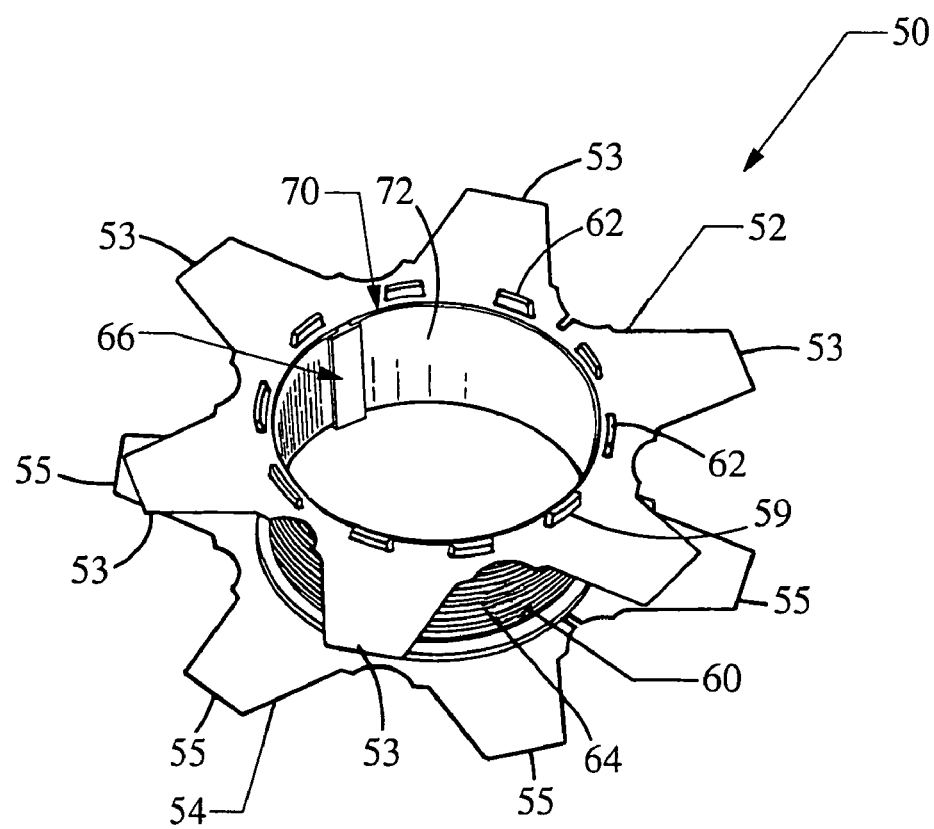
FIG. 3 is a perspective view showing the bobbin assembly of FIG. 2.

In order to facilitate connection of the first and second end caps 52, 54 to the first and second opposing ends 61, 63 of the cylinder 60, the ends 61, 63 each include a plurality of tabs 62 which are sized and positioned to correspond with a plurality of slots 59 formed in the end caps 52, 54. In this way, the projection 62 may be placed through the slots 59 and then deformed (i.e. such as by staking, ultrasonically or by heat) in order to retain the end caps 52, 54 on the opposing ends of the cylinder 60, as is best seen in FIG. 3. It should be understood that there are a number of alternatives that could be used to attach the end caps to the ends 61, 63 of the cylinder. For example, the end caps could be adhesively bonded to the cylinder ends, spin welded or mechanically interlocked.

The end caps 52, 54 are preferably made from a laminate sheet structure consisting of a combination of polyester and Nomex® material. However, a number of other laminates would also work, for example, paper laminates. In addition, stamped or molded polymer end caps may also be used. The laminate structure is preferred because of its ability to resist tearing and puncture. That is, laminates can be designed to exhibit higher tear strength than its plastic polymer counterparts. This allows the field coil 30 to be "crushed" between the pole pieces 26, 28 with greater force, increasing the heat transfer by virtue of increased contact area and contact force. Additionally, more wire can be wound into the field coil 30, since the coil 30 decreases in size when it is sandwiched or crushed between the pole pieces 26, 28.

By forming the end caps 52, 54 separately from the cylinder 60, the cylinder 60 can be molded very thin since the molten plastic does not have to flow far into the mold. Preferably, the core is molded to a wall thickness less than 0.8 mm thick. It is desirable to make the cylindrical core 60 as thin as possible in order to increase the amount of space for the field coil 30, as well as to improve the heat transfer from the hot field coil wires 30 to the center steel hub (one of which can be seen in FIG. 7 and designated at 46) of each pole piece 26, 28.

Figure 2:
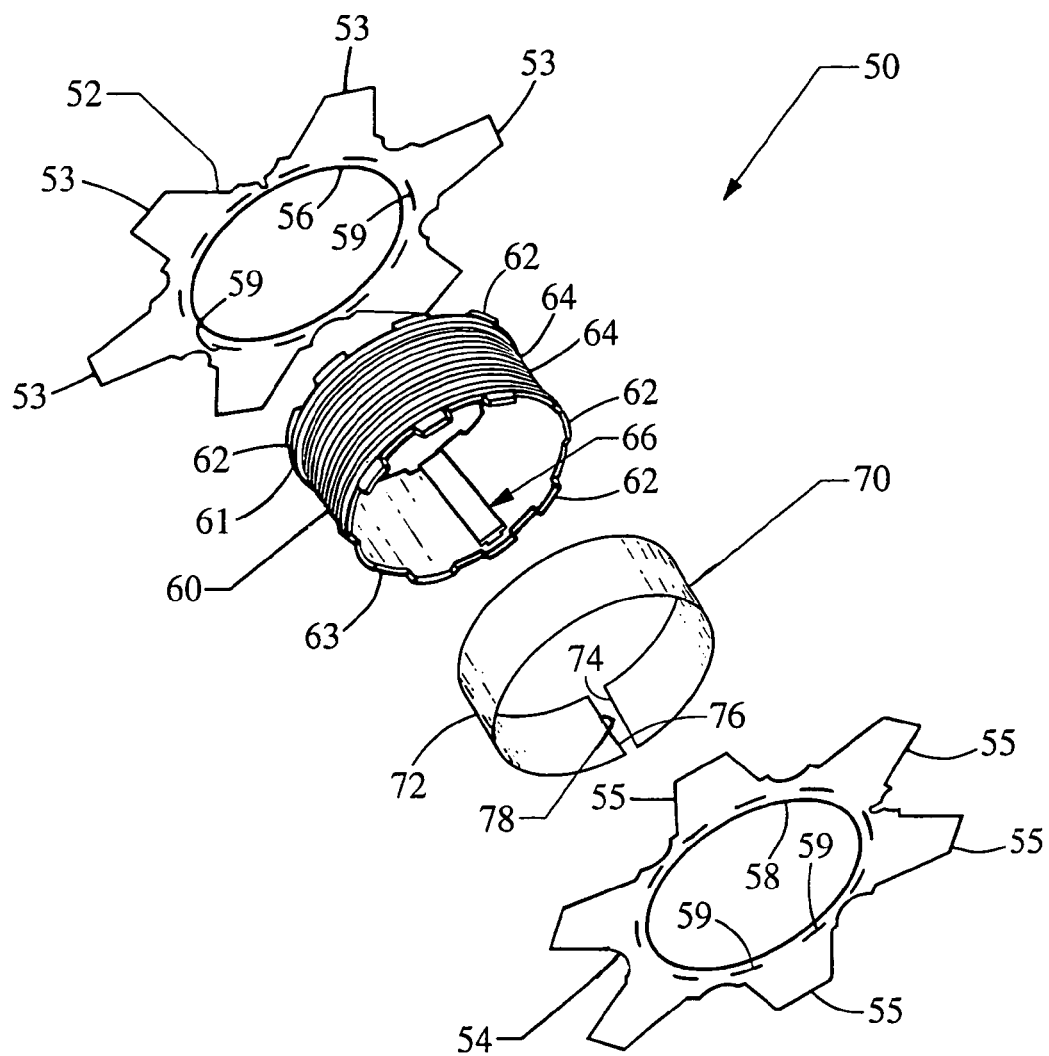
FIG. 2 is an exploded view of a bobbin assembly forming a portion of the rotor depicted in FIG. 1.

At the same time, the bobbin assembly 50 is provided with a sleeve 70 in order to provide structural support to the cylinder 60 for winding the field coil 30 directly thereon. More specifically, the sleeve 70 generally includes a sheet of metal such as steel or any other material having a rigidity greater than that of the cylinder 60, in order to provide structural support to the same. The steel sheet 72 is rolled into a cylindrical shape as shown in FIG. 2. The first and second free ends 74, 76 of the sleeve 70 are positioned adjacent each other and define a slit 78 therebetween. Stated another way, the sleeve 70 is formed to define an axial slit 78 extending completely through the steel sheet 72 and hence sleeve 70. In addition to providing structural rigidity for winding, sleeve 70, if made from a ferromagnetic material, adds to the total cross sectional area of the magnetic circuit by increasing the cross section of magnetically permeable material that the field coil surrounds. This enables more magnetic flux to be transferred through the pole piece hubs and ferromagnetic sleeve, increasing the power output of the machine.

Figure 4:
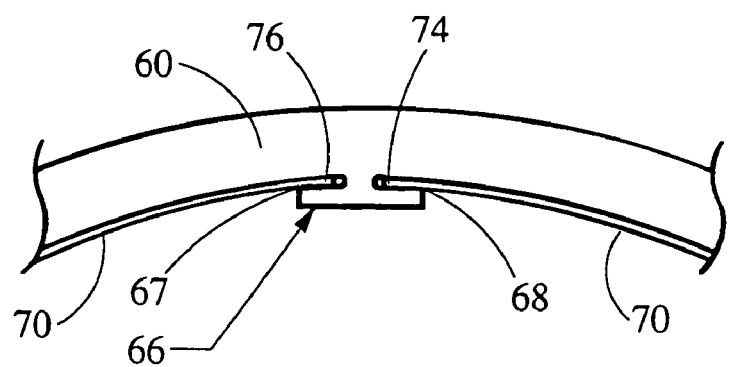
FIG. 4 is a plan view, enlarged and partially cutaway of the cylinder and sleeve forming a portion of the bobbin assembly depicted in FIGS. 2 and 3.

The cylinder 60 is also structured to facilitate connection to the sleeve 70. In particular, the inner periphery of the cylinder 60 includes a locking projection 66 which is sized and structured to be positioned within the slit 78, as is shown in FIG. 3. As best seen in FIG. 4, the locking projection 66 has a T-shape, wherein the projection 66 first extends radially away from the cylinder 60, and then extends circumferentially to define opposing slots 67, 68. Stated another way, the locking projection 66 includes two slots 67, 68 formed therein and between the projection 66 and cylinder 60. The slots 67, 68 are sized to receive the free ends 74, 76 of the sleeve 70. In particular, the slots 67, 68 extend a sufficient circumferential length to allow some movement of the sleeve 70 in order to change the effective diameter of the sleeve 70. In this way, the center steel hub 46 of each pole piece 26, 28 can vary in size, and the sleeve 70 and cylinder 60 can adjust to accommodate the hub 46. Further, this enables the hub to press fit within the sleeve to ensure a strong contact between the hub 46 and the cylinder/sleeve combination 60/70 in order to improve heat transfer therebetween. It will be understood that it is not necessary to press fit the hub within the sleeve.

Figure 5:
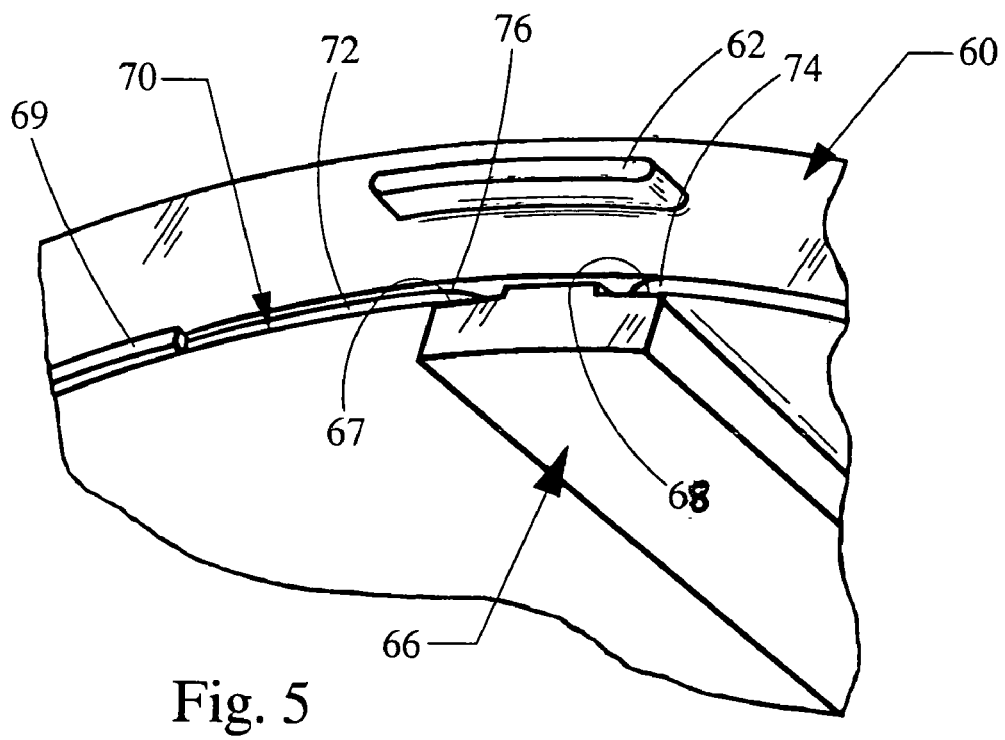
FIG. 5 is a perspective view, enlarged and partially cutaway, showing the cylinder and sleeve forming a portion of the bobbin assembly depicted in FIGS. 2 and 3.

As best seen in FIG. 5, the cylinder 60 preferably includes at least one retaining tab 69 positioned at one of the first and second ends 61, 63 of the cylinder 60. Preferably, the cylinder 60 includes a plurality of retaining tabs 69 spaced circumferentially around the periphery of the cylinder 60. The retaining tabs 69 are positioned to extend radially inwardly from the inner periphery of the cylinder 60, and thereby restrict the axial movement of the sleeve 70. Preferably, the retaining tabs 69 are located at only one end of the cylinder 60 so that the sleeve 70 may be slid in from the opposing end of the cylinder 60 not having the retaining tabs 69.

Figure 7:
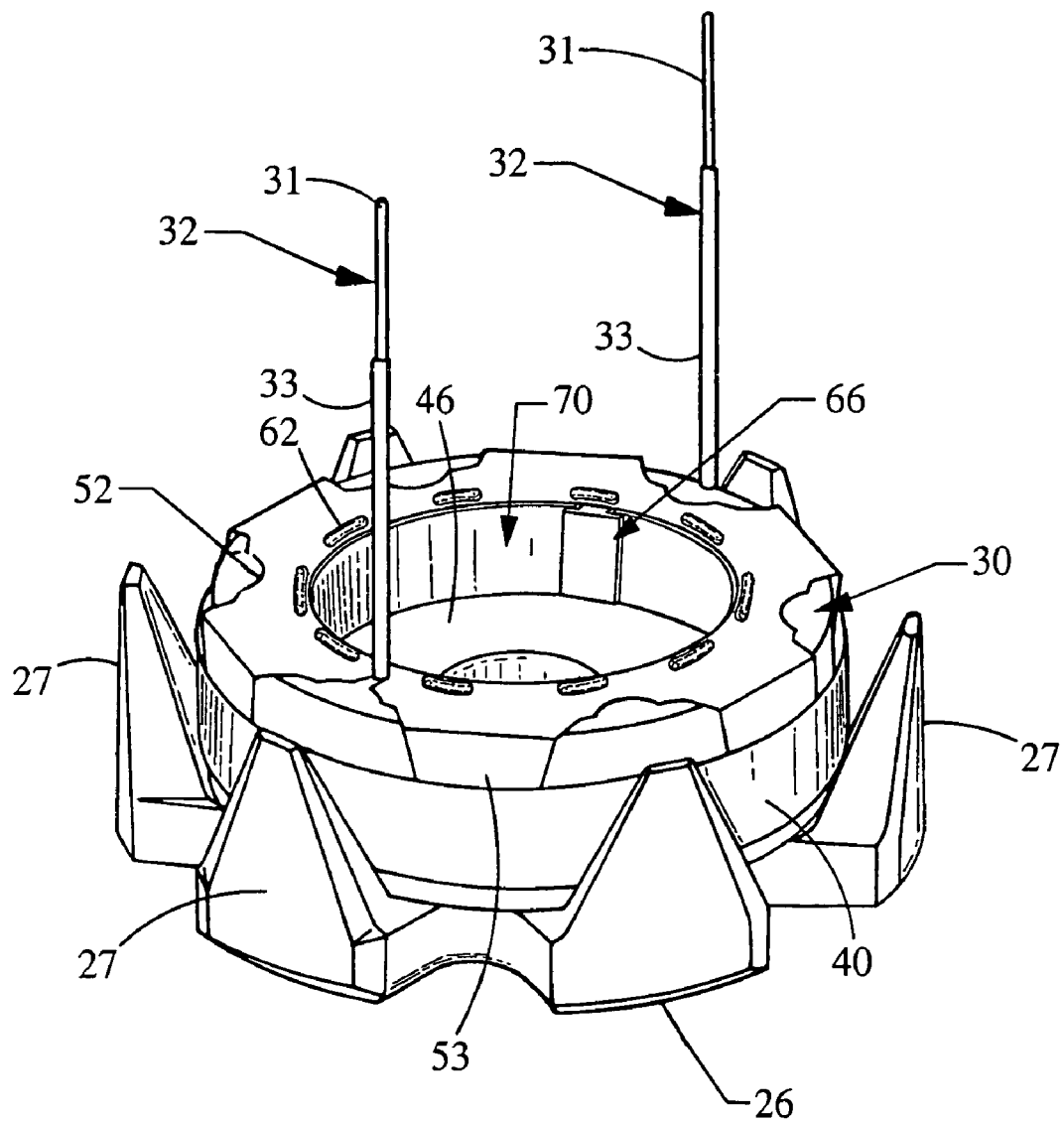
FIG. 7 is a perspective view of the rotor assembly in FIG. 1, having one pole piece removed.

Once the field coil has been wound directly onto the cylinder 60 of the bobbin assembly 50, the flaps 53, 55 of the end caps 52, 54 may be folded down over the field coil 30, and then held in place with tape 40 as shown in FIG. 7. By connecting the end caps 52, 54 together via the flaps 53, 55, by way of the tape 40, the field coil 30 is prevented from overcoming the thin end cap sidewalls causing bulging or sagging of the coil 30. At this point, the opposing pole pieces 26, 28 may be positioned at opposing ends of the bobbin assembly 50, and in particular adjacent the end caps 52, 54 to sandwich the bobbin assembly 50 and field coil 30 therebetween. Notably, the steel hub portion 46 of the pole piece 26 is positioned inside the sleeve 70, which expands to receive the hub 46. Alternatively, the tape could be replaced with an adhesive, mechanically interlocking flaps or other fastening means to secure the flaps of opposing end caps together.

Additionally, injection molding the cylinder 60 allows the formation of a plurality of grooves 64 on the outside surface of the cylinder core 60. These grooves 64 help guide the first layer of wires during the winding process of the field coil 30. This improves the quality of the winding by helping the first layer to be properly spaced, enabling the next layer to also be properly spaced. Alternatively, the grooves could be eliminated to reduce the complexity of the mold tooling.

Accordingly, the present invention provides a rotor for an alternator, which includes a bobbin assembly that allows for a thin cylindrical portion which increases the space for the field coil and hence increases the field strength. Further, the wire grooves on the outside diameter of the core further increases the percentage fill of the field coil by facilitating layered winds and utilizing more room for wire. As the cylinder is very thin, typically around 0.2 mm to 0.8 mm, the heat transfer from the hot wires to the cool steel core and pole pieces is greatly increased.

At the same time, the field coil may be wound directly onto the cylinder of the bobbin, which is provided with structural support from the sleeve. The sleeve also has an adjustable diameter which allows it to adjust to different sized hubs and expand when receiving the hubs. The structure also provides excellent contact for promoting heat transfer from the field coil to the steel core hub and resists the steel core from tearing through the thin cylinder. Furthermore, by winding the field coil directly onto the bobbin, the pole pieces may include the hub portion incorporated therein, thereby providing a single contact area between the pole pieces, thereby increasing the magnetic field conducted therethrough, and thereby increasing the power output of the machine. The incorporation of the hub into each pole also increases the structural rigidity and reduces deflection during the high speed rotation of the rotor.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A rotor for a dynamoelectric machine comprising:
   a field coil for generating a magnetic flux;
   a pair of opposing pole pieces sandwiching the field coil for guiding the magnetic flux;
   a pole hub; and
   a bobbin assembly interposed between the field coil and each of the pole pieces, the bobbin assembly including a hollow cylinder having a first end and a second end;
   a first end cap attached to the first end of the cylinder;
   a second end cap attached to the second end of the cylinder;
   a metallic sleeve fitted inside the hollow cylinder and providing support to the hollow cylinder, the sleeve defining an interior space sized to receive the pole hub.

2. The rotor of claim 1, wherein the sleeve includes an axial slit extending completely through the sleeve to allow the diameter of the sleeve to change.

3. The rotor of claim 1, wherein the sleeve is formed from a flat sheet that is rolled into a cylindrical shape.

4. The rotor of claim 2, wherein the slit in the sleeve defines first and second ends of the sleeve, and wherein the first and second ends engage the cylinder.

5. The rotor of claim 1, wherein the cylinder includes a locking projection engaging the sleeve.

6. The rotor of claim 4, wherein the cylinder includes a locking projection defining first and second slots receiving the first and second ends of the sleeve.

7. The rotor of claim 6, wherein the slots are sized find positioned to permit the diameter of the sleeve to adjust when the sleeve is attached to the cylinder.

8. The rotor of claim 1, further comprising a retaining tab extending radially inwardly from one of the first and second ends of the cylinder, the retaining tab sized and positioned to limit the axial movement of the sleeve relative to the cylinder.

9. The rotor of claim 8, further comprising a plurality of retaining tabs circumferentially spaced about one of the first and second ends of the cylinder.

10. The rotor of claim 1, wherein the cylinder alone has insufficient strength to wind the field coil directly thereon, and wherein the sleeve supports the cylinder to provide sufficient strength to wind the field coil thereon.

11. The rotor of claim 1, wherein the cylinder is constructed of injection molded plastic and has a thickness less than 0.8 mm.

12. The rotor of claim 1, wherein the cylinder includes a plurality of grooves formed on an outer surface of the cylinder for winding the field coil.

13. The rotor of claim 1, wherein the first and second end caps are constructed of a laminate.

14. The rotor of claim 1, wherein the end caps are constructed of a first material and the cylinder is constructed of a second material the first material having a greater tear resistance than the second material.

15. A bobbin assembly for an electric machine comprising:
 a field coil including a plurality of winds of wire;
 a hollow cylinder having a first end and a second end;
 a first end cap attached to the first end of the cylinder;
 a second end cap attached to the second end of the cylinder;
 a metallic sleeve formed of a thin sheet fitted inside the hollow cylinder for providing support to the hollow cylinder.

16. A rotor for an electric machine comprising:
 a field coil for generating a magnetic flux;
 a pair of opposing pole pieces sandwiching the field coil for guiding the magnetic flux; and
 a bobbin assembly interposed between the field coil and each of the pole pieces, the bobbin assembly including
  a molded hollow cylinder having a first end and a second end;
  a first end cap attached to the first end of the cylinder;
  a second end cap attached to the second end of the cylinder;
  a metallic sleeve fitted inside the hollow cylinder, said hollow sleeve including an axial slit extending completely through the sleeve allowing the diameter of the hollow sleeve to change.

17. The rotor of claim 1, wherein the pole hub is formed as part of the pair of opposing pole pieces.

18. The rotor of claim 1, wherein the pole hub includes first and second hub portions unitarily formed in the pair of opposing pole pieces.

* * * * *

UNITED STATES PATENT AND TRADEMARK OFFICE
CERTIFICATE OF CORRECTION

| | | |
|---|---|---|
| PATENT NO. | : 7,038,347 B2 | Page 1 of 1 |
| APPLICATION NO. | : 10/837965 | |
| DATED | : May 2, 2006 | |
| INVENTOR(S) | : Anthony Militello et al. | |

It is certified that error appears in the above-identified patent and that said Letters Patent is hereby corrected as shown below:

In the Claims

Column 6, in claim 7, line 49, after "slots are sized" delete "find" and insert --and--.

Signed and Sealed this

Seventh Day of November, 2006

JON W. DUDAS
*Director of the United States Patent and Trademark Office*